(12) United States Patent
Tseng et al.

(10) Patent No.: US 10,437,647 B2
(45) Date of Patent: Oct. 8, 2019

(54) CLUSTER CONFIGURATION WITH ZERO TOUCH PROVISIONING

(71) Applicant: Verizon Patent and Licensing Inc., Arlington, VA (US)

(72) Inventors: Liping Tseng, San Jose, CA (US); Annie A. Dang, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 15/716,021

(22) Filed: Sep. 26, 2017

(65) Prior Publication Data
US 2019/0095252 A1    Mar. 28, 2019

(51) Int. Cl.
| | |
|---|---|
| *G06F 9/46* | (2006.01) |
| *G06F 9/50* | (2006.01) |
| *H04L 12/24* | (2006.01) |
| *G06F 9/54* | (2006.01) |
| *H04W 8/00* | (2009.01) |

(52) U.S. Cl.
CPC .......... *G06F 9/5072* (2013.01); *G06F 9/5077* (2013.01); *H04L 41/046* (2013.01); *H04L 41/0809* (2013.01); *G06F 9/548* (2013.01); *H04W 8/005* (2013.01)

(58) Field of Classification Search
CPC ..... G06F 9/5072; G06F 9/5077; G06F 9/5088
USPC ............................................. 718/1, 101–105
See application file for complete search history.

(56) References Cited

U.S. PATENT DOCUMENTS

| | | | | |
|---|---|---|---|---|
| 7,174,379 | B2 * | 2/2007 | Agarwal | G06F 9/505 709/226 |
| 8,141,090 | B1 * | 3/2012 | Graupner | G06F 9/45558 709/225 |
| 8,296,419 | B1 * | 10/2012 | Khanna | G06F 9/5072 709/201 |
| 8,364,802 | B1 * | 1/2013 | Keagy | G06F 8/63 709/223 |
| 8,392,930 | B2 * | 3/2013 | Goldin | G06F 11/3632 715/738 |
| 8,413,139 | B2 * | 4/2013 | Shukla | G06F 9/44526 718/1 |
| 8,776,050 | B2 * | 7/2014 | Plouffe | G06F 9/45537 718/1 |

(Continued)

OTHER PUBLICATIONS

Zhai et al, "Cloud Versus In-house Cluster: Evaluating Amazon Cluster Compute Instances for Running MPI Applications", ACM, pp. 1-10, 2011 (Year: 2011).*

(Continued)

*Primary Examiner* — Anil Khatri

(57) ABSTRACT

A device can receive information associated with an application identifier of an application that is to be implemented by a cluster. The device can provide information associated with an instance identifier of the device. The device can receive information associated with a first set of instance identifiers associated with the first set of devices. The device can configure, using the information associated with the first set of instance identifiers, the device to implement the application as part of the cluster. The device can receive information associated with a second set of instance identifiers associated with a second set of devices of the cluster. The device can compare the information associated with the first set of instance identifiers and the information associated with the second set of instance identifiers. The device can selectively configure the device to implement the application as part of the cluster based on the comparison.

20 Claims, 10 Drawing Sheets

(56) References Cited

U.S. PATENT DOCUMENTS

| | | | | |
|---|---|---|---|---|
| 8,966,024 B2* | 2/2015 | Koponen | ............ | H04L 41/0823 |
| | | | | 709/220 |
| 8,972,978 B2* | 3/2015 | Astete | ................ | G06F 9/45533 |
| | | | | 718/1 |
| 9,075,788 B1* | 7/2015 | Roth | .................... | G06F 11/3006 |
| 9,294,391 B1* | 3/2016 | Mostert | .............. | H04L 61/1511 |
| 9,424,429 B1* | 8/2016 | Roth | ....................... | G06F 21/45 |
| 9,613,064 B1* | 4/2017 | Chou | .................... | G06F 16/182 |
| 9,690,829 B2* | 6/2017 | Tian | .................... | G06F 16/2471 |
| 9,734,036 B2* | 8/2017 | Baughman | ............ | H04L 41/083 |
| 9,959,157 B1* | 5/2018 | Adogla | ................. | G06F 11/079 |
| 9,971,971 B2* | 5/2018 | Eicher | ..................... | G06F 9/505 |
| 10,310,911 B2* | 6/2019 | Shau | ....................... | H04L 67/10 |

OTHER PUBLICATIONS

Yang et al, " Near-Duplicate Detection by Instance-level Constrained Clustering", ACM, pp. 421-428, 2006 (Year: 2006).*

Monteiro et al, "Model for Dynamic Configuration and Power Management in Virtualized Heterogeneous Web Clusters", ACM, pp. 464-467 (Year: 2015).*

Qi et al, "A Principled and Flexible Framework for Finding Alternative Clusterings", ACM, pp. 717-725 (Year: 2009).*

Navarrete et al, "Parallel simulation of NEPs on clusters", IEEE, 171-174 (Year: 2011).*

Zhai et al, "Cloud Versus In-house Cluster: Evaluating Amazon Cluster Copute Instances for Running MPI Applications", ACM, pp. 1-10 (Year: 2011).*

Mitchell Anicas, "How to Set Up a Production Elasticsearch Cluster on Ubuntu 14.04," https://www.digitalocean.com/community/tutorials/how-to-set-up-a-production-elasticsearch-cluster-on-ubuntu-14-04, Feb. 22, 2016, 17 pages.

Rklick Solutions LLC, "Kafka & ZooKeeper: Multi Node Cluster Setup," https://rklicksolutions.wordpress.com/2016/05/02/kafka-zookeeper/, May 2, 2016, 3 pages.

Ankit Rajput, "Apache Multi Broker Cluster with Multi Node Zookeeper: Multi Broke Multi Zookeeper Video," https://www.youtube.com/watch?v=SxHsnNYxcww, Jul. 15, 2016, 3 pages.

* cited by examiner

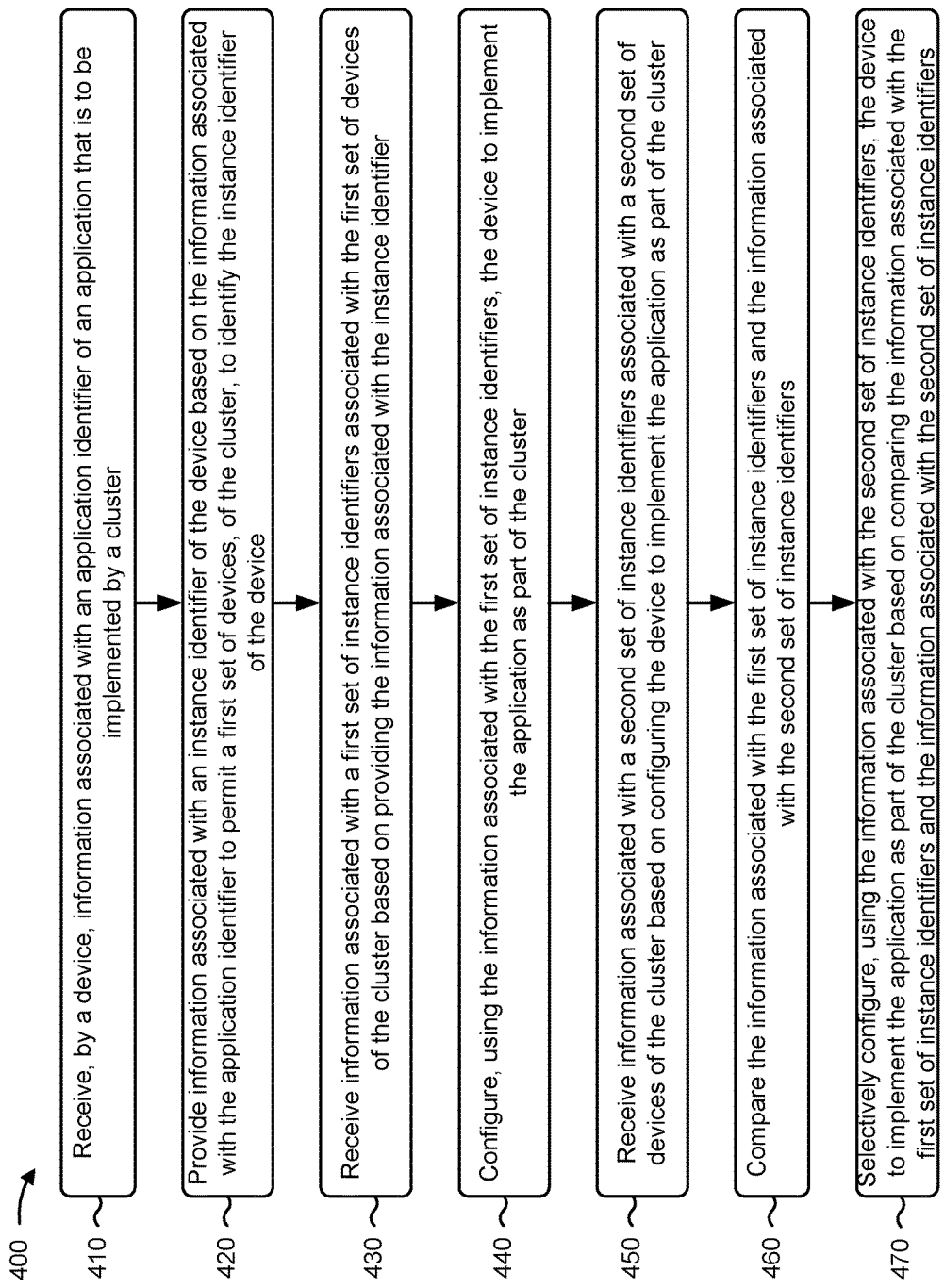

CLUSTER CONFIGURATION WITH ZERO TOUCH PROVISIONING

BACKGROUND

Zero touch provisioning can refer to automatically configuring devices in a network, which eliminates the need for manual configuration and intervention.

BRIEF DESCRIPTION OF THE DRAWINGS

FIG. 4 is a flow chart of an example process for performing cluster configuration with zero touch provisioning.

DETAILED DESCRIPTION OF PREFERRED EMBODIMENTS

The following detailed description of example implementations refers to the accompanying drawings. The same reference numbers in different drawings can identify the same or similar elements.

In data center environments, a cluster of computing resources (e.g., server devices, virtual machines, and/or the like) can collectively execute applications and perform other tasks. In this way, a cluster increases application reliability, permits high-availability of an application, permits load-balancing, improves network performance, and/or the like. In practice, a cluster can include thousands, millions, etc. of computing resources. To permit cluster configuration, each computing resource of the cluster might require information associated with the other computing resources of the cluster. That is, each computing resource of the cluster might need to be provisioned with information associated with network addresses (e.g., Internet protocol (IP) addresses, media access control (MAC) addresses, and/or the like) of the other computing resources to permit the cluster to be implemented.

In some cases, a cluster can be dynamically scaled up or scaled down based on application demand. For example, additional computing resources can be added to the cluster or computing resources can be removed from the cluster. In light of the large number (e.g., thousands, millions, etc.) of computing resources of a cluster and the dynamic nature (e.g., real-time scalability) of the cluster, manual configuration of a cluster can prove impossible, impractical, time-consuming, error-prone, subjective, and/or the like.

Some implementations described herein provide a cluster platform including a set of computing resources that include zero touch provisioning modules. The computing resources (e.g., the zero touch provisioning modules) can automatically perform cluster configuration and cluster re-configuration, as described elsewhere herein. In this way, some implementations described herein reduce an amount of manual cluster configuration, permit dynamic cluster configuration and/or re-configuration for clusters including thousands, millions, etc. of computing resources, reduce errors associated with cluster configuration, improve network performance by reducing an amount of time associated with cluster configuration (which conserves processor and/or storage utilization), and/or the like.

Figure 1A:
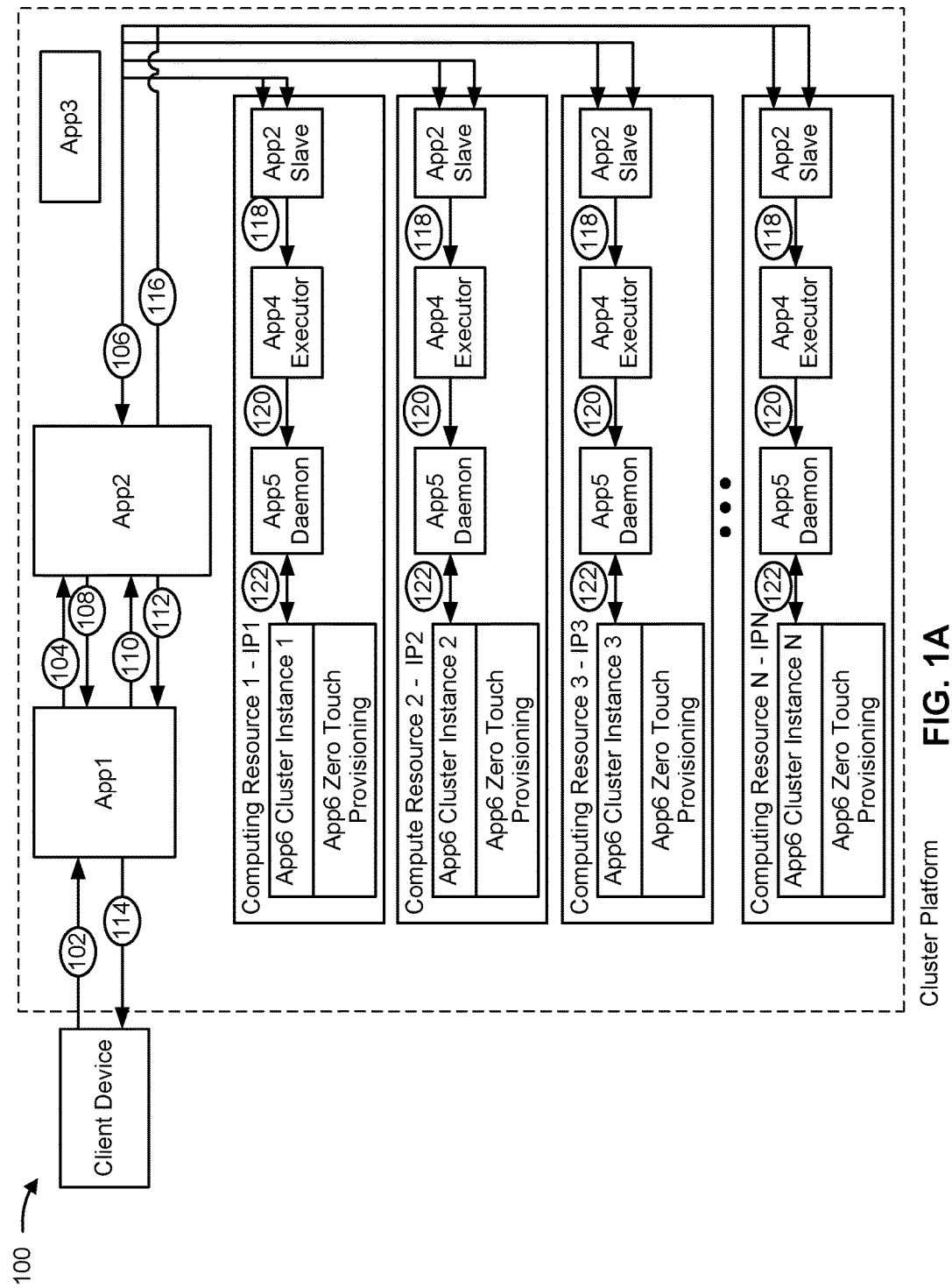
FIGS. 1A-1G are diagrams of an overview of an example implementation described herein.

FIGS. 1A-1G are diagrams of an overview of an example implementation 100 described herein. As shown in FIG. 1A, example implementation 100 can include a client device and a cluster platform. As shown, the cluster platform can include a set of computing resources, such as computing resource 1, computing resource 2, computing resource 3, and computing resource N. Additionally, as shown, the cluster platform can execute a set of applications, shown as "App1," "App2," "App3," "App4," "App5," and "App6."

As shown in FIG. 1A, and by reference number 102, the cluster platform (e.g., App1) can receive, from a client device (e.g., which might have received an input from a network operator), a request to deploy an application (e.g., App6). As an example, App 1 can include an application associated with cluster management and/or application deployment. As an example, App 6 can include any application that is capable of being implemented by a set of computing resources.

In some implementations, the client device can provide, to the cluster platform, application configuration information associated with deploying App6. As used herein, application configuration information can refer to information that permits an application to be deployed. As an example, the application configuration information can include a set of JavaScript object notation (JSON) files that includes information associated with the application to be deployed, a number of instances of the application to be executed, a resource utilization requirement associated with the application, and/or the like.

As further shown in FIG. 1A, and by reference number 104, App 1 can provide, to App2, a request for information associated with resource utilization values of computing resources of the cluster platform. As an example, App2 can include an application that monitors resource utilization values and/or network metric values of computing resources (e.g., processor utilization values, memory utilization values, throughput values, latency values, bandwidth values, delay values, and/or the like).

As further shown in FIG. 1A, and by reference number 106, the set of computing resources (e.g., respective App2 slaves) can provide, to App2 (e.g., an App2 master), information associated with resource utilization values and/or network metric values of the respective computing resources. As shown by reference number 108, App2 can provide, to App1, information associated with the resource utilization values and/or the network metric values of the set of computing resources.

As further shown in FIG. 1A, and by reference number 110, App 1 can schedule a job based on the information received from App2. In other words, App 1 can identify, using the information received from App2 d the application configuration information, particular computing resources that are to implement App6. As an example, the job can correspond to deploying App 6 to the set of computing resources.

As further shown in FIG. 1A, and by reference number 112, App2 can provide, to App 1, information that identifies that a set of tasks, associated with the job, has been scheduled. For example, a task can refer to deploying a particular instance of App 6 to a particular computing resource. As shown by reference number 114, App 1 can provide, to the client device, information that identifies that the job has been scheduled.

As further shown in FIG. 1A, and by reference number 116, App2 (e.g., the App2 master) can provide, to the set of computing resources (e.g., respective App2 slaves), respective instructions to execute App6. As shown by reference number 118, App2 slaves can provide, to App 4 executors, instructions to deploy App6. As an example, App4 can include an application that is capable of using application configuration information to schedule an application to be deployed.

As further shown in FIG. 1A, and by reference number 120, App4 executors can provide, to App5 daemons, requests to execute containers associated with App6. As used herein, a container can refer to an application that includes code, system tools, system libraries, etc., that is executed by a computing resource, and that can share access to a kernel of an operating system of a computing resource with other containers (e.g., using operating system level virtualization). In other words, a container can include a self-contained execution environment. As an example, App 5 can include an application that is capable of causing containers to be executed.

As further shown in FIG. 1A, and by reference number 122, App5 can deploy a set of containers associated with App 6. For example, computing resource 1 can execute a first container (e.g., App6 cluster instance 1), computing resource 2 can execute a second container (e.g., App 6 cluster instance 2), computing resource 3 can execute a third container (e.g., App6 cluster instance 3), and computing resource N can execute a fourth container (e.g., App 6 cluster instance N). It should be understood that, in practice, thousands, millions, etc. of containers can be deployed.

As shown, each computing resource and/or container can be provisioned with a network address (e.g., an IP address, a MAC address, and/or the like). For example, each computing resource and/or container can be dynamically provisioned with a network address based on a container being executed by the computing resource. As such, manual configuration and/or re-configuration of the cluster can prove impossible, impractical, time-consuming, error-prone, and/or the like, as described elsewhere herein.

As shown, each container can include a zero touch provisioning module. For example, and as described elsewhere herein, the zero touch provisioning module can permit each computing resource to automatically perform cluster configuration and/or re-configuration.

Figure 1B:
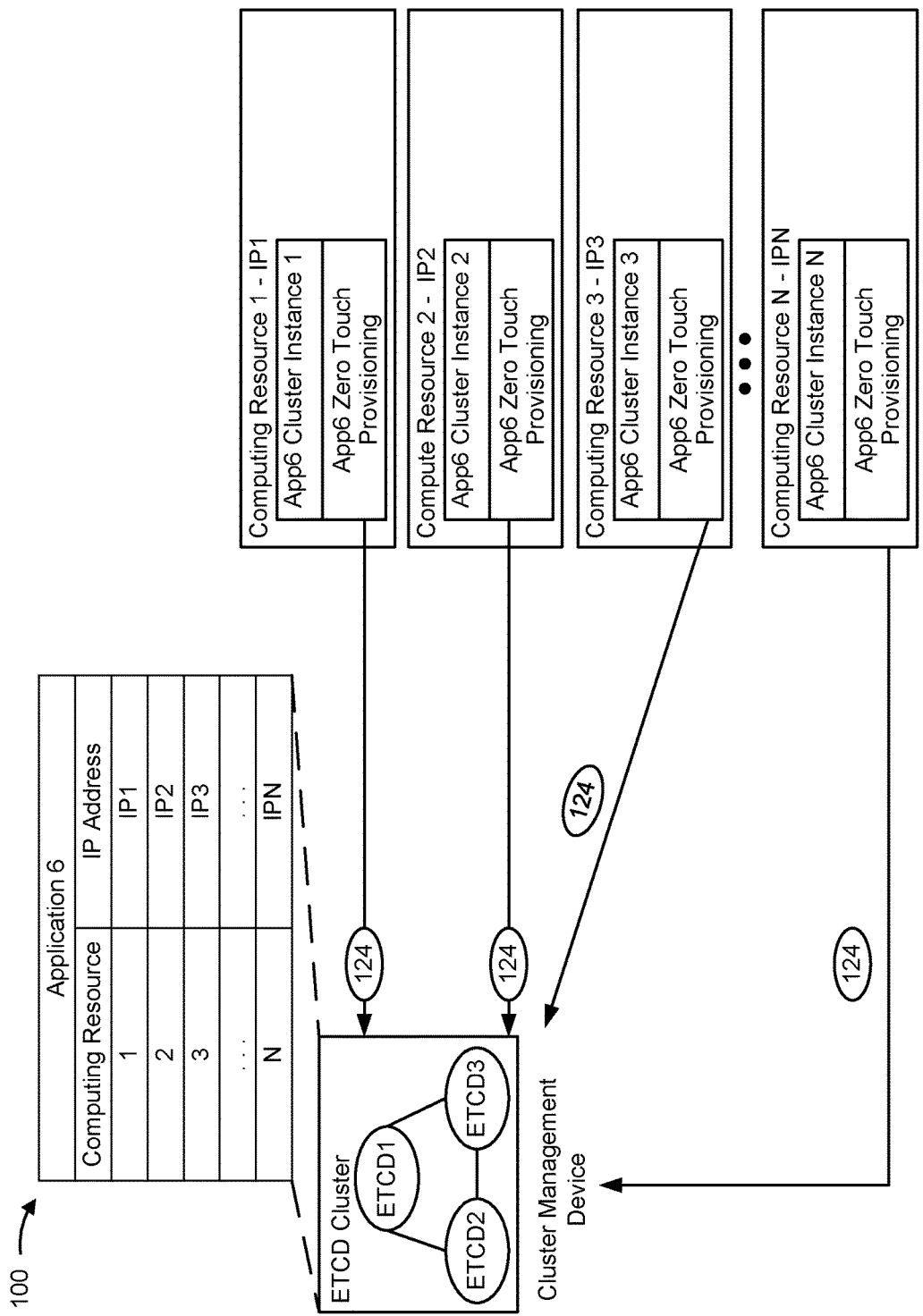

As shown in FIG. 1B, and by reference number 124, the zero touch provisioning modules of each computing resource can provide, to a cluster management device (e.g., shown as an ETCD cluster), information that identifies respective instance identifiers of the computing resources. As an example, the cluster management device can include an ETCD cluster, which is a distributed key value store that permits data storage across a cluster.

In some implementations, a computing resource can receive, from the cluster management device, an application identifier associated with App6. For example, an application identifier can include information that identifies an application. In some implementations, a computing resource can provide, to the cluster management device, information that identifies an instance identifier of the computing resource. For example, computing resource 1 can provide, to the cluster management device, information associated with an instance identifier of computing resource 1. As an example, the instance identifier can include a network address of computing resource 1 (e.g., IP1). As used herein, an instance identifier can include information that identifies a particular instance of an application and/or a particular computing resource of a cluster.

In this way, the cluster management device can receive, from each computing resource of the cluster, information associated with a respective instance identifier. Additionally, the cluster management device can store, in a data structure, information associated with the instance identifiers, as described below.

Figure 1C:
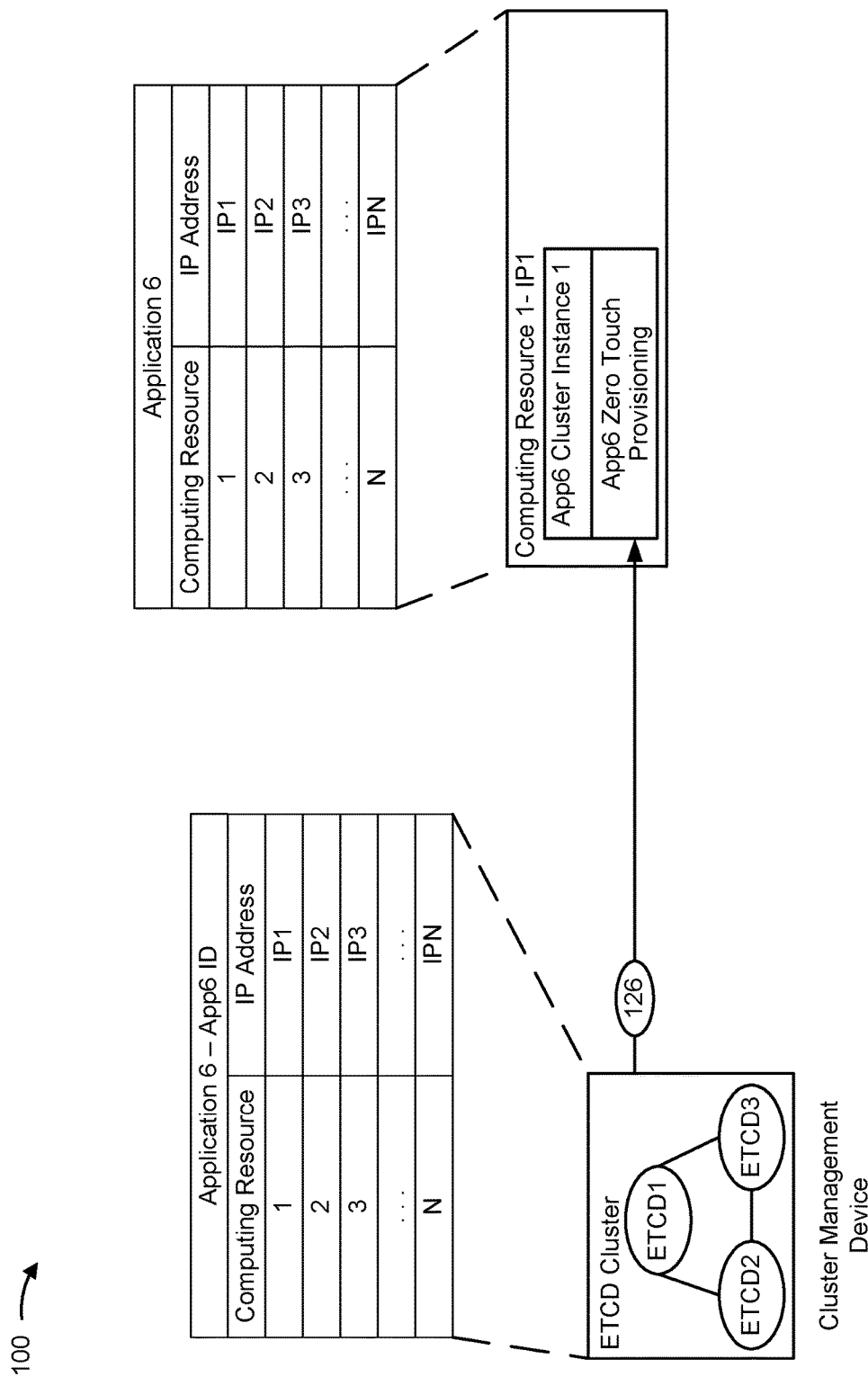

As shown in FIG. 1C, the cluster management device can store, in a data structure, information associated with App 6 (e.g., an App 6 identifier shown as "App 6 ID"), information associated with the set of computing resources, and/or information associated with a set of instance identifiers (e.g., IP addresses of the computing resources).

As shown by reference number 126, the cluster management device can provide, to the zero touch provisioning module of computing resource 1, information associated with the set of instance identifiers. In this way, and as shown, computing resource 1 can store information associated with respective instance identifiers of the other computing resources that are part of the cluster. While a particular computing resource (e.g., computing resource 1) is shown in FIG. 1C, it should be understood that the other computing resources of the cluster can perform similar operations substantially concurrently.

In some implementations, a computing resource (e.g., a zero touch provisioning module) can configure the computing resource to join the cluster based on cluster configuration information and the information associated with the set of instance identifiers. As used herein, cluster configuration information can refer to information that permits a set of computing resources to implement a cluster. For example, cluster configuration information can include Apache Kafka cluster configuration information, Apache Zookeeper cluster configuration information, Kubernetes cluster configuration information, and/or the like. It should be understood that implementations described herein are applicable to other types of clusters and/or other types of cluster configuration information.

By receiving information associated with the set of instance identifiers, each computing resource can automatically perform cluster configuration. In other words, the computing resources can perform cluster configuration with zero touch provisioning (e.g., without having received manual input from a network operator). Because of the large number of computing resources of the cluster and the dynamic nature of network address assignment, some implementations described herein reduce the need for manual configuration, reduce errors associated with cluster configuration, reduce an amount of time associated with cluster configuration (which conserves processor and/or storage utilization), and/or the like. Additionally, the cluster can perform automatic re-configuration, as described below.

Figure 1D:
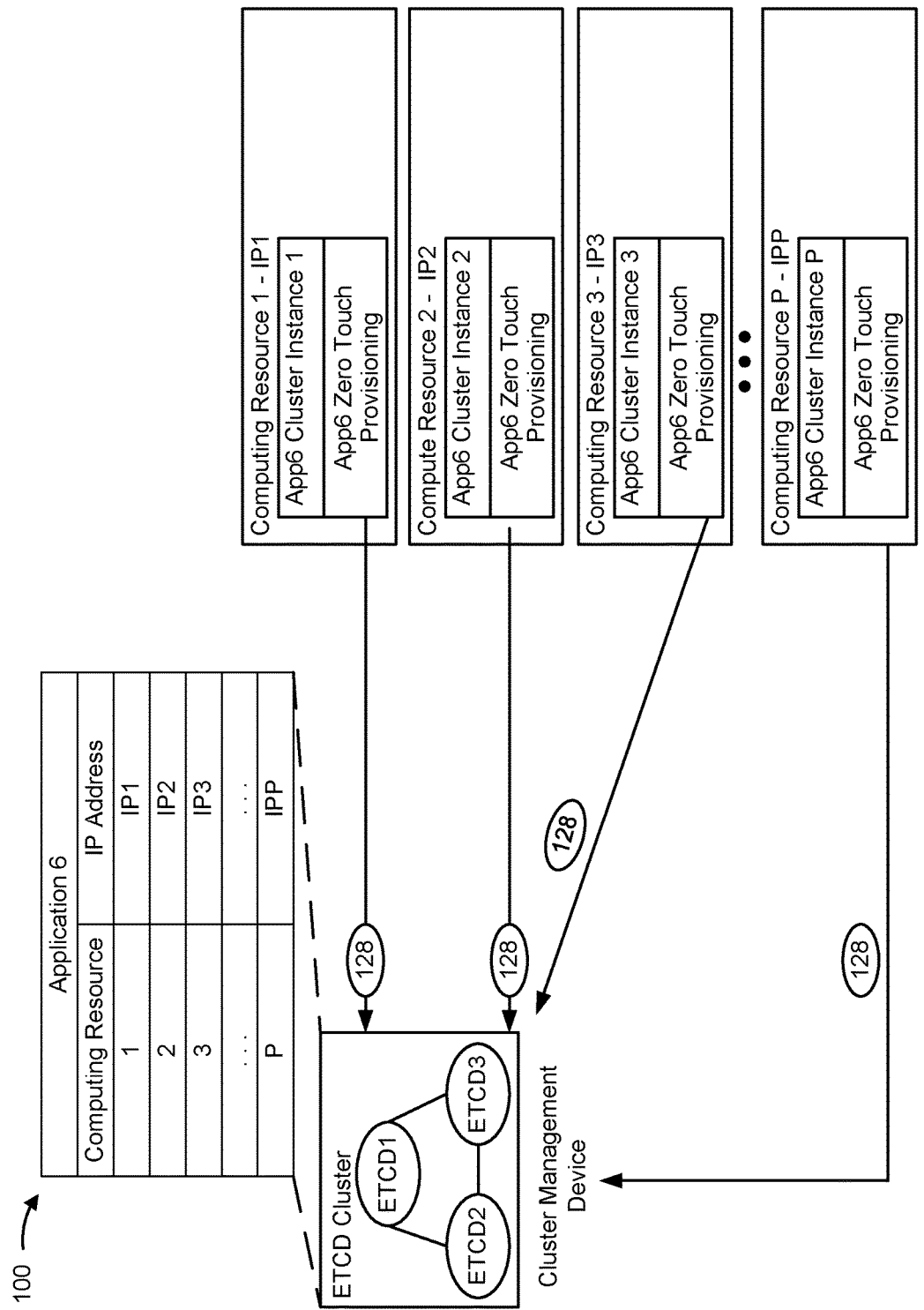

As shown in FIG. 1D, assume that the cluster has been scaled up by adding additional computing resources (e.g., instances) to the cluster. For example, as shown, the cluster includes P computing resources (e.g., where P>N). As shown by reference number 128, the zero touch provisioning modules of the computing resources can provide, to the cluster management device, information that identifies respective instance identifiers of the computing resources in a similar manner as described above in connection with reference number 124 (FIG. 1B). In this way, the cluster management device can update a data structure to include the additional instance identifiers of the additional computing resources (e.g., IP1 through IPP).

Figure 1E:
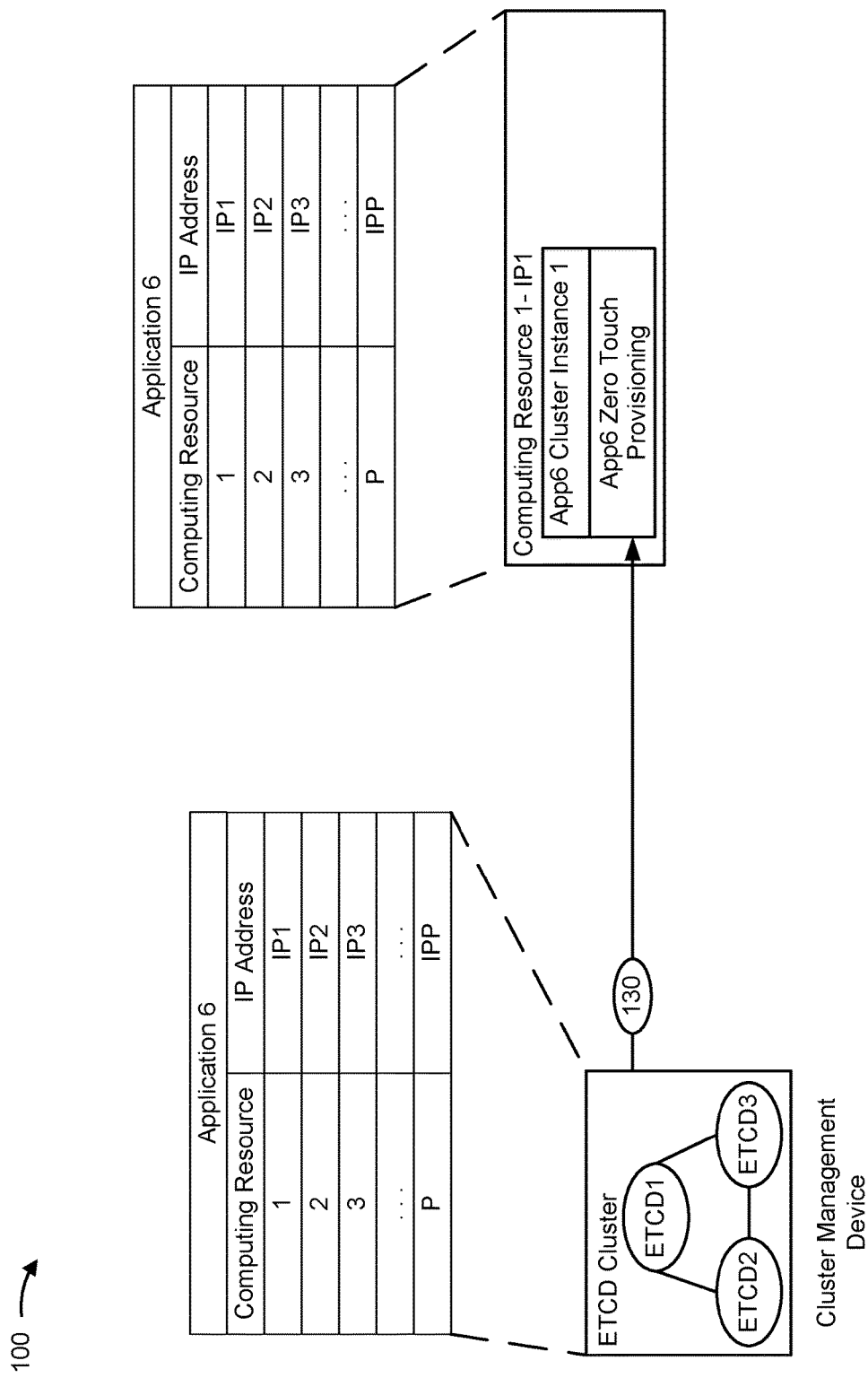

As shown in FIG. 1E, and by reference number 130, the cluster management device can provide, to the zero touch provisioning module of computing resource 1, information associated with the set of instance identifiers in a similar manner as described above in connection with reference number 126 (FIG. 1C). In some implementations, the cluster management device can provide, to the computing resources, information associated with the set of instance identifiers based on a time frame (e.g., periodically, such as every five seconds, every minute, etc.), based on time to live values, based on requests from the computing resources, and/or the like. In this way, the computing resources (e.g., the zero touch provisioning modules) can compare the information associated with the set of instance identifiers and previously received information associated with the set of instance identifiers, as described below.

Figure 1F:
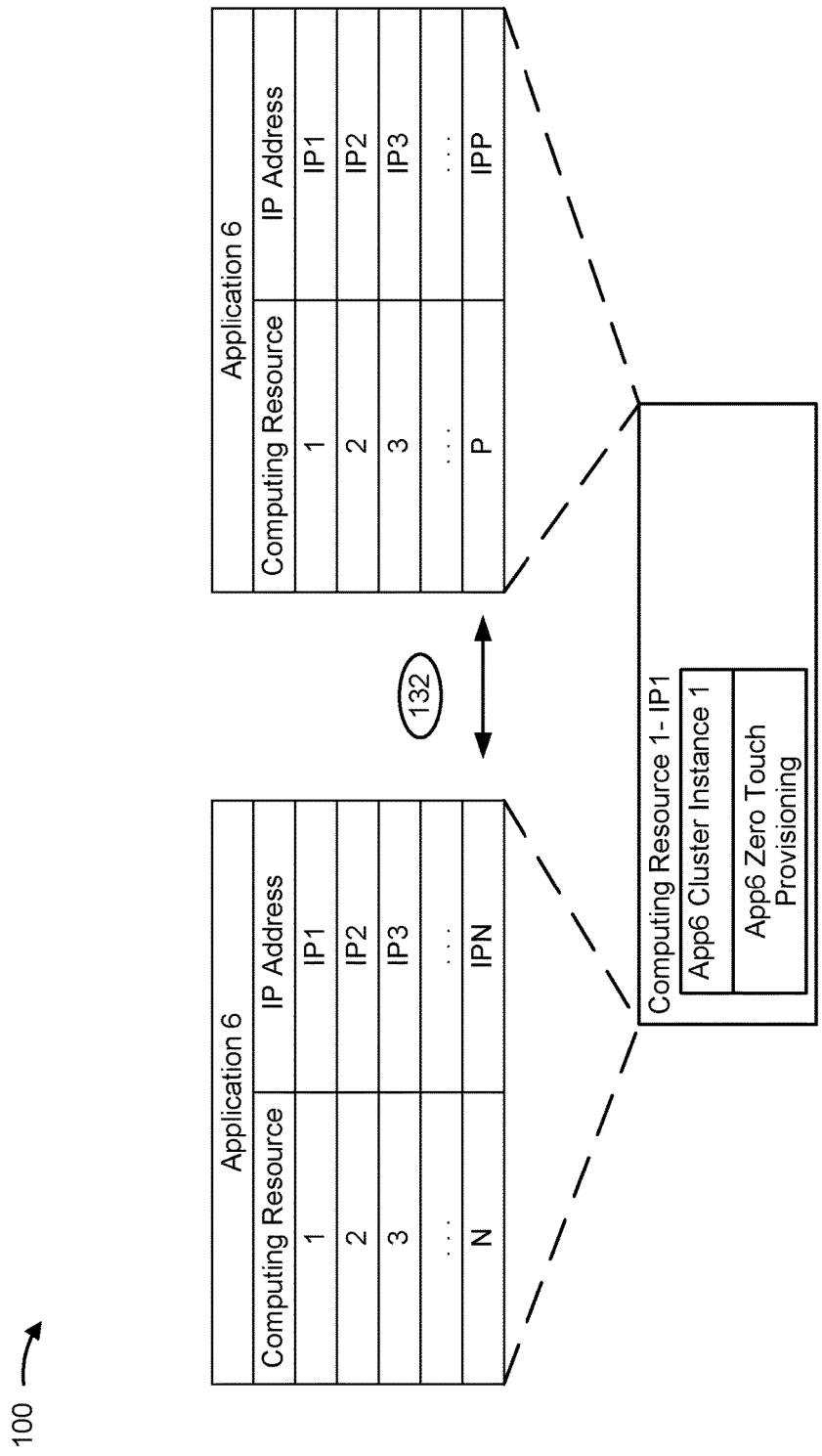

As shown in FIG. 1F, and by reference number 132, computing resource 1 (e.g., the zero touch provisioning module) can compare information associated with a first set of instance identifiers (e.g., received in association with reference number 126) and information associated with a second set of instance identifiers (e.g., received in association with reference number 130).

In some implementations, a computing resource can compare information associated with a first set of instance identifiers and information associated with a second set of instance identifiers. For example, a computing resource can receive, from cluster management device, information associated a set of instance identifiers of the cluster, and can compare the information and previously received information. In this way, a computing resource can determine, based on the comparison, whether additional computing resources (e.g., instances) have been added to the cluster, whether computing resources have been removed from the cluster, or whether a number of instances associated with the cluster remains unchanged.

For example, as shown in FIG. 1F, computing resource 1 (e.g., the zero touch provisioning module) can determine that a number of instances of the cluster has changed. As an example, computing resource 1 can determine that there are P instances whereas there were previously N instances. In this case, computing resource 1 can configure computing resource 1 based on the updated set of instance identifiers to permit computing resource 1 to operate as part of the cluster. For example, computing resource 1 can use the cluster configuration information and the information associated with the set of instance identifiers to configure computing resource 1 to operate as part of the cluster including the additional computing resources. In this way, some implementations herein permit automatic re-configuration of a cluster.

Figure 1G:
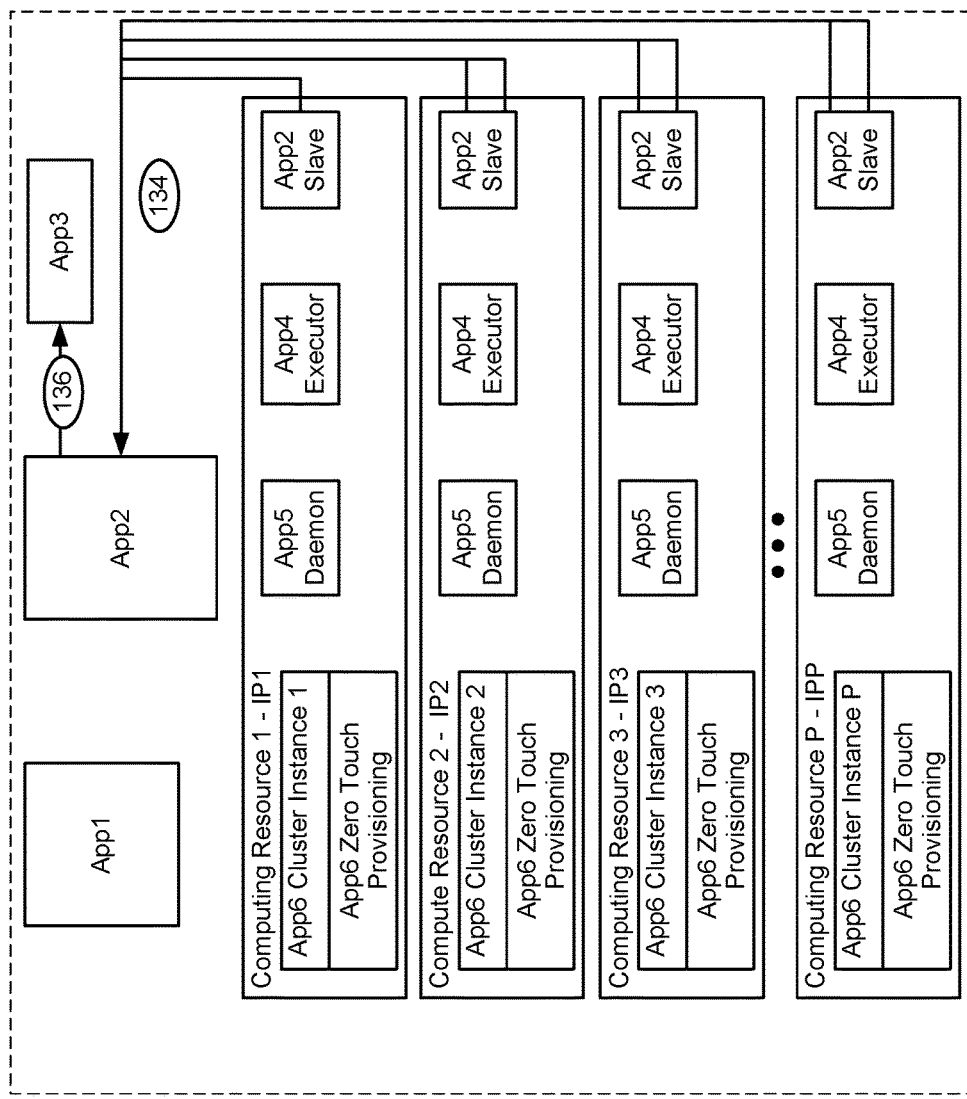

As shown in FIG. 1G, and by reference number 134, the set of computing resources (e.g., respective App2 slaves) can provide, to App2 (e.g., App2 master), information that identifies that the set of computing resource is implementing the cluster. As shown by reference number 136, App2 can provide, to App3, information associated with respective network addresses of the set of computing resources to permit App3 to update domain name system (DNS) information. In this way, App6 can be accessed by external computing devices.

As indicated above, FIGS. 1A-1G is provided merely as an example. Other examples are possible and can differ from what was described with regard to FIGS. 1A-1G. In practice, there can be additional devices, fewer devices, different devices, or differently arranged devices than those shown in FIGS. 1A-1G. Furthermore, two or more devices shown in FIGS. 1A-1G can be implemented within a single device, or a single device shown in FIGS. 1A-1G can be implemented as multiple, distributed devices. Additionally, or alternatively, a set of devices (e.g., one or more devices) of FIGS. 1A-1G can perform one or more functions described as being performed by another set of devices of FIGS. 1A-1G.

Figure 2:
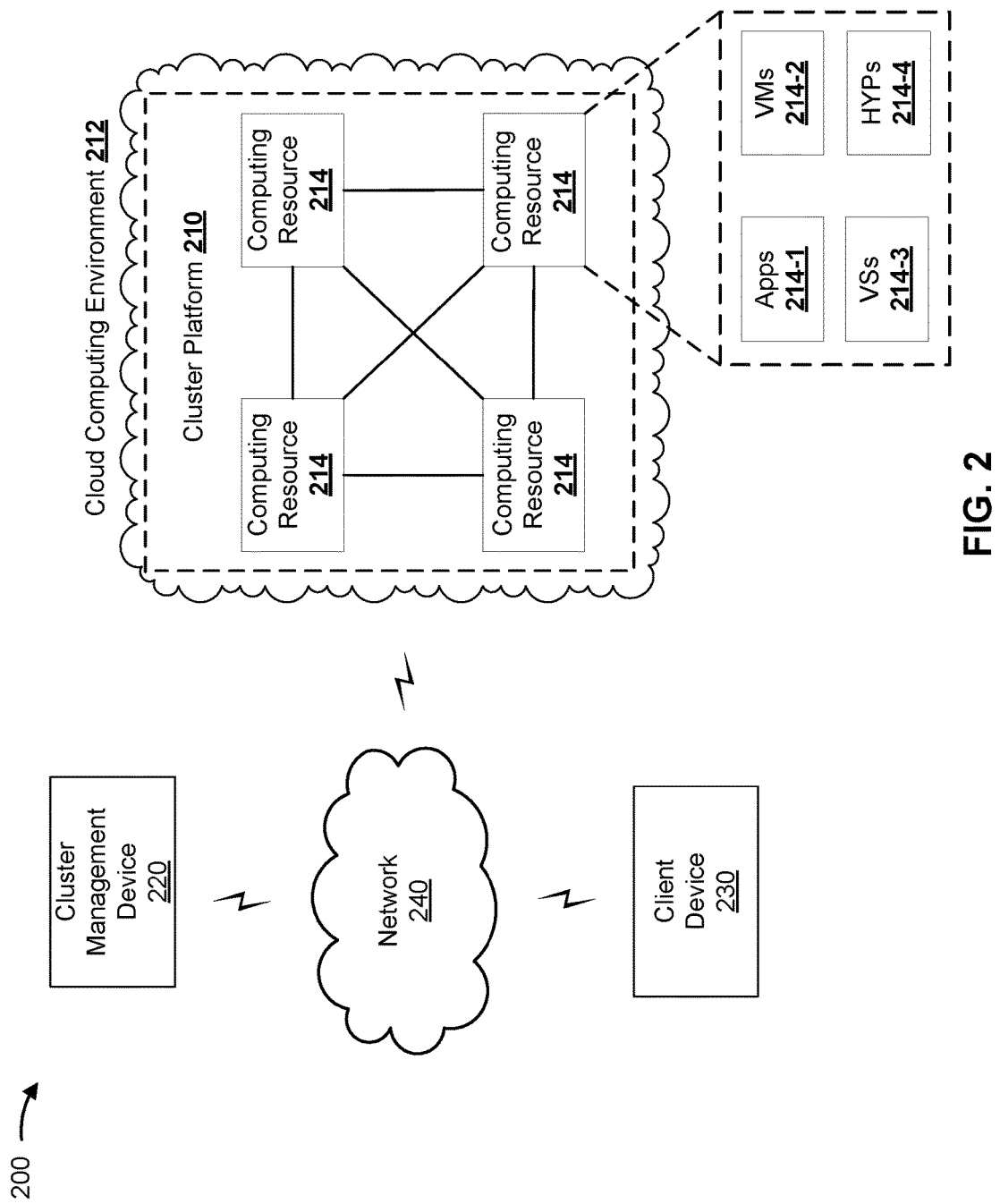
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a cluster platform 210, a cluster management device 220, a client device 230, and a network 240. Devices of environment 200 can interconnect via wired connections, wireless connections, optical connections, or a combination of connections.

Cluster platform 210 includes one or more devices capable of provisioning a cluster to execute an application. In some implementations, cluster platform 210 can be designed to be modular such that certain software components can be swapped in or out depending on a particular need. As such, cluster platform 210 can be easily and/or quickly reconfigured for different uses.

In some implementations, as shown, cluster platform 210 can be hosted in a cloud computing environment 212. Notably, while implementations described herein describe cluster platform 210 as being hosted in cloud computing environment 212, in some implementations, cluster platform 210 might not be cloud-based (i.e., can be implemented outside of a cloud computing environment) or can be partially cloud-based.

Cloud computing environment 212 includes an environment that hosts cluster platform 210. Cloud computing environment 212 can provide computation, software, data access, storage, etc. services that do not require end-user (e.g., client device 230) knowledge of a physical location and configuration of system(s) and/or device(s) that hosts cluster platform 210. As shown, cloud computing environment 212 can include a group of computing resources 214 (referred to collectively as "computing resources 214" and individually as "computing resource 214").

Computing resource 214 includes one or more personal computers, workstation computers, server devices, or other types of computation and/or communication devices. In some implementations, computing resource 214 can host cluster platform 210. The cloud resources can include compute instances executing in computing resource 214, storage devices provided in computing resource 214, data transfer devices provided by computing resource 214, etc. In some implementations, computing resource 214 can communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, and/or the like.

Application 214-1 includes one or more software applications that can be provided to or accessed by client device 230. Application 214-1 can eliminate a need to install and execute the software applications on client device 230. For example, application 214-1 can include software associated with cluster platform 210 and/or any other software capable of being provided via cloud computing environment 212. In some implementations, one application 214-1 can send/receive information to/from one or more other applications 214-1, via virtual machine 214-2.

Virtual machine 214-2 includes a software implementation of a machine (e.g., a computer) that executes programs like a physical machine. Virtual machine 214-2 can be either a system virtual machine or a process virtual machine, depending upon use and degree of correspondence to any real machine by virtual machine 214-2. A system virtual machine can provide a complete system platform that supports execution of a complete operating system ("OS"). A process virtual machine can execute a single program, and can support a single process. In some implementations, virtual machine 214-2 can execute on behalf of a user (e.g., client device 230), and can manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 214-4 can provide hardware virtualization techniques that allow multiple operating systems (e.g., "guest operating systems") to execute concurrently on a host computer, such as computing resource 214. Hypervisor 214-4 can present a virtual operating platform to the guest operating systems, and can manage the execution of the guest operating systems. Multiple instances of a variety of operating systems can share virtualized hardware resources.

Cluster management device 220 includes one or more devices capable of receiving, generating, storing, processing, and/or providing information associated with cluster platform 210. Cluster management device 220 can include a server that includes particular information for use by cluster platform 210. For example, cluster management device 220 can include a server or a group of servers (e.g., a cloud-based server, an application device, a content server, a host server, a web server, a database server, etc.), a desktop computer, or a similar device. In some implementations, cluster management device 220 may be provided in cloud computing environment 212 and implemented by one or more computing resources 214.

Client device 230 includes one or more devices capable of receiving, generating, storing, processing, and/or providing information associated with cluster platform 210. For example, client device 230 can include a device, such as a desktop computer, a laptop computer, a tablet computer, a handheld computer, a server device, a mobile phone (e.g., a smart phone or a radiotelephone), a wearable communication device (e.g., a smart wristwatch, an activity band, or a pair of smart eyeglasses), a gaming device, or a similar type of device.

Network 240 includes one or more wired and/or wireless networks. For example, network 240 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
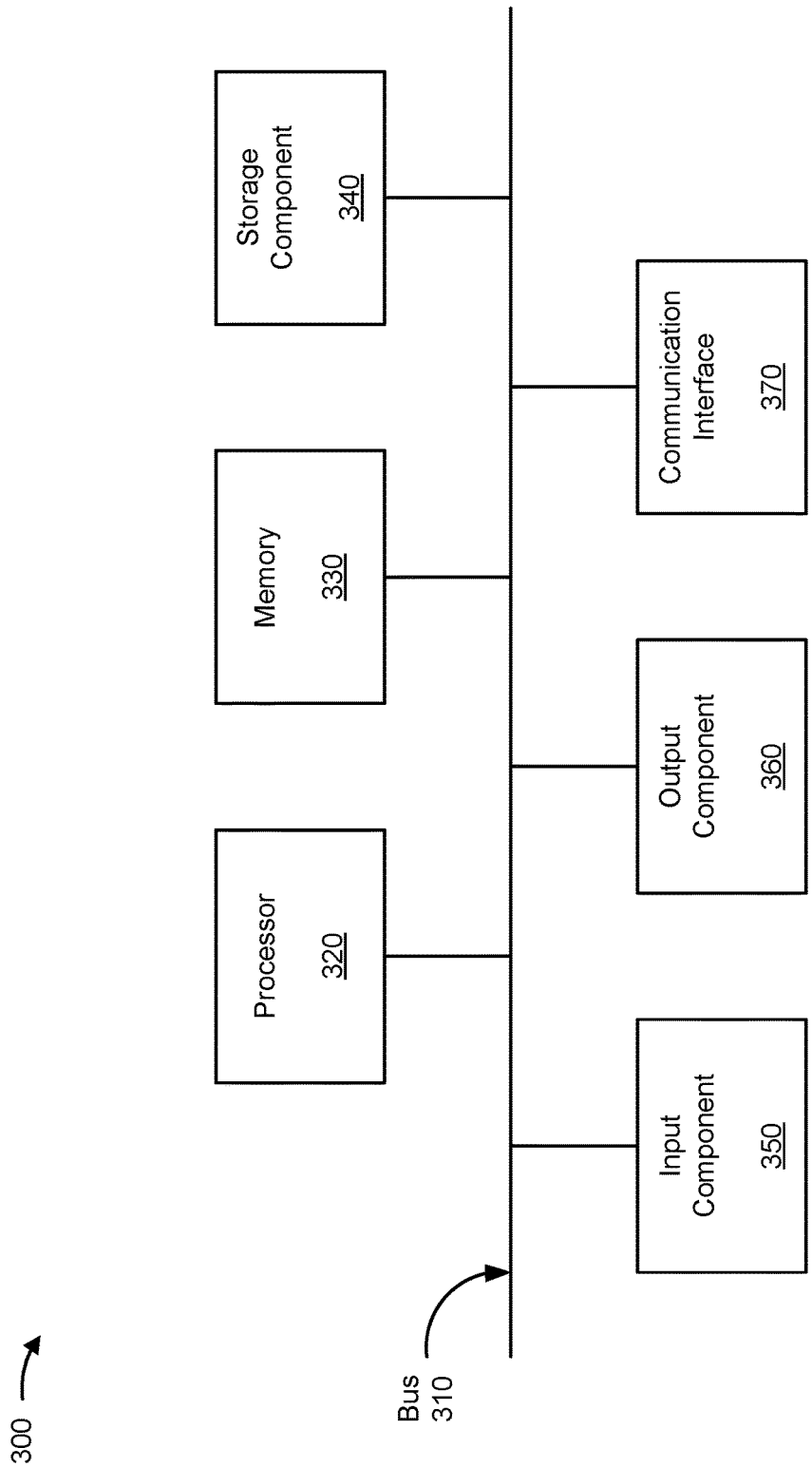
FIG. 3 is a diagram of example components of one or more devices of FIG. 2.

FIG. 3 is a diagram of example components of a device 300. Device 300 can correspond to cluster platform 210, computing resource 214, cluster management device 220, and/or client device 230. In some implementations, cluster platform 210, computing resource 214, cluster management device 220, and/or client device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for performing cluster configuration with zero touch provisioning. In some implementations, one or more process blocks of FIG. 4 can be performed by computing resource 214. In some implementations, one or more process blocks of FIG. 4 can be performed by another device or a group of devices separate from or including computing resource 214, such as cluster platform 210, cluster management device 220, and/or client device 230.

As shown in FIG. 4, process 400 can include receiving, by a device, information associated with an application identifier of an application that is to be implemented by a cluster (block 410). For example, computing resource 214 can receive, from cluster management device 220, information associated with an application identifier of an application that is to be implemented by a cluster of computing resources 214.

In some implementations, a cluster of computing resources 214 can collectively implement an application. For example, each computing resource 214 can execute a container that can represent an instance of the application. In practice, the cluster can include thousands, millions, etc. of instances.

In some implementations, client device 230 (e.g., which might have received an input from a network operator) can provide, to cluster platform 210, information that causes cluster platform 210 to deploy an application as a set of containers. For example, client device 230 can provide application configuration information that permits cluster platform 210 to deploy the application as a set of containers.

In some implementations, cluster platform 210 can receive the application configuration information based on an input from client device 230, based on a time frame (e.g., periodically), based on retrieving the application configuration information, and/or the like.

In some implementations, cluster platform 210 can identify a set of computing resources 214 to execute containers based on the application configuration information. Additionally, or alternatively, cluster platform 210 can provide, to the set of computing resources 214, information that causes the computing resources 214 to execute respective containers.

In some implementations, computing resource 214 can execute a container as part of the cluster based on receiving information from cluster platform 210. Additionally, or alternatively, computing resource 214 can be provisioned with a set of network addresses based on executing the container. For example, computing resource 214 can be provisioned with an IP address, a MAC address, and/or the like. While implementations herein describe a single computing resource 214, it should be understood that, in practice, thousands, millions, etc. of computing resources 214 can perform similar operations substantially concurrently.

In some implementations, computing resource 214 can identify an application identifier associated with the application based on executing the container. As used herein, an application identifier can refer to information that identifies an application. In this way, each computing resource 214, that is to be part of the cluster, can provide information to cluster management device 220 based on the application identifier, as described below.

As further shown in FIG. 4, process 400 can include providing information associated with an instance identifier of the device based on the information associated with the application identifier to permit a first set of devices, of the cluster, to identify the instance identifier of the device (block 420). For example, computing resource 214 can provide, to cluster management device 220, information associated with an instance identifier of computing resource 214 to permit other computing resources 214, that are to be part of the cluster, to identify the instance identifier of computing resource 214.

In some implementations, an instance identifier can refer to information that identifies a particular instance of the cluster. For example, each computing resource 214, that is part of the cluster, can include a respective instance identifier. As examples, an instance identifier can include a network address, a device identifier of computing resource 214, a value (e.g., a sequence number, a unique number, an integer, a random value, and/or the like), an alphabetical identifier, an alphanumeric identifier, and/or the like.

In some implementations, computing resource 214 can provide, to cluster management device 220, information associated with the instance identifier of computing resource 214 and information associated with the application identifier. In some implementations, cluster management device 220 can receive, from computing resource 214, the information and can store the information. In some implementations, cluster management device 220 can receive, from each computing resource 214 that is to be part of the cluster, a respective instance identifier. In this way, cluster management device 220 can store, in a data structure, information that associates the application identifier and each instance identifier.

By receiving the information associated with the instance identifier of computing resource 214, cluster management device 220 permits a first set of devices (e.g., other computing resources 214 that are to be part of the cluster) to identify the instance identifier of computing resource 214.

In this way, each computing resource 214 can receive, from cluster management device 220, information associated with a set of instance identifiers, as described below.

As further shown in FIG. 4, process 400 can include receiving information associated with a first set of instance identifiers associated with the first set of devices of the cluster based on providing the information associated with the instance identifier (block 430). For example, computing resource 214 can receive, from cluster management device 220, information associated with a first set of instance identifiers of a first set of computing resources 214.

In some implementations, computing resource 214 can provide, to cluster management device 220, a request for information associated with the first set of instance identifiers. For example, computing resource 214 can provide, to cluster management device 220, a request for information associated with instance identifiers that are associated with the application identifier. In this case, cluster management device 220 can search a data structure using the application identifier, identify the set of instance identifiers, and provide information associated with the instance identifiers to computing resource 214. In some implementations, cluster management device 220 can provide, to computing resource 214, the information associated with the instance identifiers without having received a request from computing resource 214.

In this way, computing resource 214 can receive information associated with the first set of instance identifiers, and can configure computing resource 214 to be part of the cluster using the information associated with the first set of instance identifiers, as described below.

As further shown in FIG. 4, process 400 can include configuring, using the information associated with the first set of instance identifiers, the device to implement the application as part of the cluster (block 440). For example, computing resource 214 can configure computing resource 214 to implement the application as part of the cluster based on the information associated with the first set of instance identifiers.

In some implementations, computing resource 214 can configure computing resource 214 using cluster configuration information and information associated with a set of instance identifiers of the cluster. In this way, computing resource 214 can perform automatic configuration, and can reduce a need of a network operator to manually input instance identifiers of the set of computing resources 214 of the cluster. Thereby, some implementations reduce errors associated with cluster configuration, reduce an amount of time associated with cluster configuration (which conserves processor and/or storage utilization), and permit the cluster to be re-configured quickly and dynamically.

In this way, computing resource 214 can configure computing resource 214 to operate as part of the cluster, and can receive additional information associated with instance identifiers of the cluster, as described below.

As further shown in FIG. 4, process 400 can include receiving information associated with a second set of instance identifiers associated with a second set of devices of the cluster based on configuring the device to implement the application as part of the cluster (block 450). For example, computing resource 214 can receive, from cluster management device 220, information associated with a second set of instance identifiers in a similar manner as described above in connection with block 430.

In some implementations, computing resource 214 can periodically receive, from cluster management device 220, information associated with instance identifiers of computing resources 214. The cluster might be scaled up (e.g., additional instances added), might be scaled down (e.g., instances removed), might be adjusted (e.g., instances moved to different computing resources 214), or might remain static (e.g., no instances removed or added).

In some implementations, computing resource 214 can receive information associated with instance identifiers of computing resources 214 based on a time frame, based on determining that a time to live value associated with previously received information has elapsed, based on providing a request for the information, and/or the like.

In this way, computing resource 214 can compare the information received in association with block 430 and the information received in association with block 450, as described below.

As further shown in FIG. 4, process 400 can include comparing the information associated with the first set of instance identifiers and the information associated with the second set of instance identifiers (block 460), and selectively configuring, using the information associated with the second set of instance identifiers, the device to implement the application as part of the cluster based on comparing the information associated with the first set of instance identifiers and the information associated with the second set of instance identifiers (block 470).

For example, computing resource 214 can selectively configure computing resource 214 using the information associated with the second set of instance identifiers and the cluster configuration information based on comparing the information associated with the first set of instance identifiers and the information associated with the second set of instance identifiers.

In some implementations, computing resource 214 can perform a comparison and determine that the information associated with the first set of instance identifiers matches the information associated with the second set of instance identifiers. As an example, the number of instances of the cluster might not have changed, the set of computing resources 214 implementing the cluster might not have changed, and/or the like. As such, the information associated with the first set of instance identifiers can be the same as the information associated with the second set of instance identifiers. In this case, computing resource 214 can refrain from configuring computing resource 214 using the information associated with the second set of instance identifiers because computing resource 214 is already configured to implement the cluster.

In some implementations, computing resource 214 can perform a comparison and determine that the information associated with the first set of instance identifiers does not match the information associated with the second set of instance identifiers. As an example, the number of instances of the cluster might have changed based on the cluster being scaled up or scaled down, the set of computing resources 214 that is implementing the cluster might have been adjusted, and/or the like. As such, the information associated with the first set of instance identifiers might not be the same as the information associated with the second set of instance identifiers. In this case, computing resource 214 can configure, using the information associated with the second set of instance identifiers, computing resource 214 to implement the application as part of the cluster. For example, computing resource 214 may update cluster configuration information, and perform a reboot.

In this way, some implementations described herein permit computing resources 214 of cluster platform 210 to perform automatic cluster configuration. For example, by periodically receiving and comparing information associated with instance identifiers of the cluster, computing resources 214 can detect that the cluster has been modified and perform cluster re-configuration automatically. Thereby, some implementations described herein reduce errors associated with cluster configuration, reduce an amount of time associated with cluster configuration (which conserves processor and/or storage utilization), improve network performance, and/or the like. Additionally, in this way, some implementations described herein conserve processor and/or memory resources of computing resources 214 based on the above.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive information associated with an application identifier of an application that is to be implemented by a cluster;
provide information associated with an instance identifier of the device based on the information associated with the application identifier to permit a first set of devices, of the cluster, to identify the instance identifier of the device;
receive information associated with a first set of instance identifiers associated with the first set of devices of the cluster based on providing the information associated with the instance identifier;
configure automatically, using compute instances executing in a computing resource and using the information associated with the first set of instance identifiers, the device to implement the application as part of the cluster;
receive, based on a time frame, information associated with a second set of instance identifiers associated with a second set of devices of the cluster based on configuring the device to implement the application as part of the cluster;
compare the information associated with the first set of instance identifiers and the information associated with the second set of instance identifiers; and
selectively configure, using the information associated with the second set of instance identifiers,
the device to implement the application as part of the cluster based on comparing the information associated with the first set of instance identifiers and the information associated with the second set of instance identifiers.

2. The device of claim 1, where the one or more processors are further to:
determine that the information associated with the first set of instance identifiers matches the information associated with the second set of instance identifiers; and
where the one or more processors, when selectively configuring, using the information associated with the second set of instance identifiers, the device to implement the application as part of the cluster, are to:
refrain from configuring, using the information associated with the second set of instance identifiers, the device to implement the application as part of the cluster based on determining that the information associated with the first set of instance identifiers matches the information associated with the second set of instance identifiers.

3. The device of claim 1, where the one or more processors are further to:
determine that the information associated with the first set of instance identifiers does not match the information associated with the second set of instance identifiers; and
where the one or more processors, when selectively configuring, using the information associated with the second set of instance identifiers, the device to implement the application as part of the cluster, are to:
configure, using the information associated with the second set of instance identifiers, the device to implement the application as part of the cluster based on determining that the information associated with the first set of instance identifiers does not match the information associated with the second set of instance identifiers.

4. The device of claim 1, where the one or more processors are further to:
deploy a container associated with the application to be implemented by the cluster; and
where the one or more processors, when receiving the information associated with the application identifier, are to:
receive the information associated with the application identifier based on deploying the container associated with the application to be implemented by the cluster.

5. The device of claim 1, where the instance identifier of the device includes a network address of the device.

6. The device of claim 1, where the one or more processors are further to:
provide, to another device and using the application identifier, a request for the information associated with the first set of instance identifiers; and
where the one or more processors, when receiving the information associated with the first set of instance identifiers, are to:
receive the information associated with the first set of instance identifiers based on a response to the request.

7. The device of claim 1, where the one or more processors are further to:
determine that a time to live value associated with the information associated with the first set of instance identifiers has elapsed; and
where the one or more processors, when receiving the information associated with the second set of instance identifiers, are to:
receive the information associated with the second set of instance identifiers based on determining that the time to live value has elapsed.

8. A non-transitory computer-readable medium storing instructions, the instructions comprising:
one or more instructions that, when executed by one or more processors of a device, cause the one or more processors to:
receive information associated with an application identifier of an application that is to be implemented by a cluster;
provide information associated with an instance identifier of the device based on the information associated with the application identifier to permit a first set of devices, of the cluster, to identify the instance identifier of the device;
receive information associated with a first set of instance identifiers associated with the first set of devices of the cluster based on providing the information associated with the instance identifier;
configure automatically, using compute instances executing in a computing resource and using the information associated with the first set of instance identifiers, the device to implement the application as part of the cluster;
receive, based on a time frame, information associated with a second set of instance identifiers associated with a second set of devices of the cluster based on configuring the device to implement the application as part of the cluster;
compare the information associated with the first set of instance identifiers and the information associated with the second set of instance identifiers; and
selectively configure, using the information associated with the second set of instance identifiers,
the device to implement the application as part of the cluster based on comparing the information associated with the first set of instance identifiers and the information associated with the second set of instance identifiers.

9. The non-transitory computer-readable medium of claim 8, where the one or more instructions, when executed by the one or more processors, further cause the one or more processors to:
determine that the information associated with the first set of instance identifiers matches the information associated with the second set of instance identifiers; and
where the one or more instructions, that cause the one or more processors to selectively configure, using the information associated with the second set of instance identifiers, the device to implement the application as part of the cluster, cause the one or more processors to:
refrain from configuring, using the information associated with the second set of instance identifiers, the device to implement the application as part of the cluster based on determining that the information associated with the first set of instance identifiers matches the information associated with the second set of instance identifiers.

10. The non-transitory computer-readable medium of claim 8, where the one or more instructions, when executed by the one or more processors, further cause the one or more processors to:
determine that the information associated with the first set of instance identifiers does not match the information associated with the second set of instance identifiers; and
where the one or more instructions, that cause the one or more processors to selectively configure, using the information associated with the second set of instance identifiers, the device to implement the application as part of the cluster, cause the one or more processors to:
configure, using the information associated with the second set of instance identifiers, the device to implement the application as part of the cluster based on determining that the information associated with the first set of instance identifiers does not match the information associated with the second set of instance identifiers.

11. The non-transitory computer-readable medium of claim 8, where the one or more instructions, when executed by the one or more processors, further cause the one or more processors to:
deploy a container associated with the application to be implemented by the cluster; and
where the one or more instructions, that cause the one or more processors to receive the information associated with the application identifier, are to:
receive the information associated with the application identifier based on deploying the container associated with the application to be implemented by the cluster.

12. The non-transitory computer-readable medium of claim 8, where the instance identifier of the device includes an Internet protocol address of the device.

13. The non-transitory computer-readable medium of claim 8, where the one or more instructions, when executed by the one or more processors, further cause the one or more processors to:
provide, to another device, a set of resource utilization values;
receive, from the other device and based on providing the set of resource utilization values, an instruction to implement the application as part of the cluster; and
where the one or more instructions, that cause the one or more processors to receive the information associated with the application identifier, cause the one or more processors to:
receive the information associated with the application identifier based on the instruction to implement the application as part of the cluster.

14. The non-transitory computer-readable medium of claim 8, where the one or more instructions, when executed by the one or more processors, further cause the one or more processors to:
receive cluster configuration information that permits the device to implement the application as part of the cluster; and
where the one or more instructions, that cause the one or more processors to configure, using the information associated with the first set of instance identifiers, the device to implement the application as part of the cluster, cause the one or more processors to:
configure, using the information associated with the first set of instance identifiers, the device to implement the application as part of the cluster based on the cluster configuration information.

15. A method, comprising:
receiving, by a device, information associated with an application identifier of an application that is to be implemented by a cluster;
providing, by the device, information associated with an instance identifier of the device based on the information associated with the application identifier to permit a first set of devices, of the cluster, to identify the instance identifier of the device;
receiving, by the device, information associated with a first set of instance identifiers associated with the first set of devices of the cluster based on providing the information associated with the instance identifier;
configuring automatically, by the device, using compute instances executing in a computing resource and using the information associated with the first set of instance identifiers, the device to implement the application as part of the cluster;
receiving, by the device and based on a time frame, information associated with a second set of instance identifiers associated with a second set of devices of the cluster based on configuring the device to implement the application as part of the cluster;
comparing, by the device, the information associated with the first set of instance identifiers and the information associated with the second set of instance identifiers; and
selectively configuring, by the device and using the information associated with the second set of instance identifiers,
the device to implement the application as part of the cluster based on comparing the information associated with the first set of instance identifiers and the information associated with the second set of instance identifiers.

16. The method of claim 15, further comprising:
determining that the information associated with the first set of instance identifiers matches the information associated with the second set of instance identifiers; and
where selectively configuring, using the information associated with the second set of instance identifiers, the device to implement the application as part of the cluster comprises:
refraining from configuring, using the information associated with the second set of instance identifiers, the device to implement the application as part of the cluster based on determining that the information associated with the first set of instance identifiers matches the information associated with the second set of instance identifiers.

17. The method of claim 15, further comprising:
determining that the information associated with the first set of instance identifiers does not match the information associated with the second set of instance identifiers; and
where selectively configuring, using the information associated with the second set of instance identifiers, the device to implement the application as part of the cluster comprises:
configuring, using the information associated with the second set of instance identifiers, the device to implement the application as part of the cluster based on determining that the information associated with the first set of instance identifiers does not match the information associated with the second set of instance identifiers.

18. The method of claim 15, further comprising:
deploying a container associated with the application to be implemented by the cluster; and
where receiving the information associated with the application identifier comprises:
receiving the information associated with the application identifier based on deploying the container associated with the application to be implemented by the cluster.

19. The method of claim 15, where the first set of instance identifiers includes network addresses associated with the first set of devices.

20. The method of claim 15, further comprising:
receiving application configuration information that permits the application to be implemented by the cluster; and
where receiving the information associated with the application identifier comprises:
receiving the information associated with the application identifier based on the application configuration information.

* * * * *